(12) United States Patent
Zarabadi et al.

(10) Patent No.: US 6,666,092 B2
(45) Date of Patent: Dec. 23, 2003

(54) ANGULAR ACCELEROMETER HAVING BALANCED INERTIA MASS

(75) Inventors: Seyed R. Zarabadi, Kokomo, IN (US); Ian D. Jay, Logansport, IN (US); Jack D. Johnson, Russiaville, IN (US); John C. Christenson, Kokomo, IN (US); Tracy A. Noll, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/085,933

(22) Filed: Feb. 28, 2002

(65) Prior Publication Data

US 2003/0159511 A1 Aug. 28, 2003

(51) Int. Cl.[7] .......................... G01P 15/00; G01P 15/125
(52) U.S. Cl. ................................. 73/514.02; 73/514.32; 73/514.38
(58) Field of Search .......................... 73/514.32, 514.38, 73/514.02, 514.01, 514.12, 514.16, 514.29, 504.04, 432.1

(56) References Cited

U.S. PATENT DOCUMENTS

| | | | |
|---|---|---|---|
| 2,912,657 A | 11/1959 | Schaevitz | 336/30 |
| 2,916,279 A | 12/1959 | Stanton | 264/1 |
| 4,435,737 A | 3/1984 | Colton | 361/280 |
| 4,699,006 A | 10/1987 | Boxenhorn | 73/517 |
| 4,736,629 A | 4/1988 | Cole | 73/517 |

(List continued on next page.)

FOREIGN PATENT DOCUMENTS

| | | | | |
|---|---|---|---|---|
| SU | 0583397 | 12/1977 | ............... | 73/517 A |
| SU | 1035523 | 8/1983 | ............... | 73/517 A |
| SU | 1040424 | 9/1983 | ............... | 73/517 A |

OTHER PUBLICATIONS

"Rejecting Rotational Disturbances on Small Disk Drives Using Rotational Accelerometers" Daniel Y. Abramovitch, 1996, IFAC World Congress in San Francisco, CA 1996, pp. 1–6.

"Increased Disturbance Rejection in Magnetic Disk Drives by Acceleration Feedforward Control and Parameter Adaption" M.T. White and M. Tomizuka, vol. 5, No. 6, 1997, pp. 741–751.

"Surface Micromachined Angular Accelerometer with Force Feedback" T.J. Brosnihan, A.P. Pisano and R.T. Howe, DSC–vol. 57–2, 1995, IMECE pp. 941–947.

"Embedded Interconnect and Electrical Isolation for High–Aspect–Ratio, SOI Inertial Instruments" T.J. Brosnihan, J.M. Bustillo, A.P. Pisano and R.T. Howe, 1997 International Conference on Solid–State Sensors and Actuators, Chicago, Jun. 16–19, 1997, pp. 637–640.

*Primary Examiner*—Hezron Williams
*Assistant Examiner*—Tamiko Bellamy
(74) *Attorney, Agent, or Firm*—Jimmy L. Funke; Stefan V. Chmielewski

(57) ABSTRACT

A balanced angular accelerometer is provided having a substrate, a fixed electrode with a plurality of fixed capacitive plates, and a rotational inertia mass with a central opening and substantially suspended over a cavity and including a plurality of movable capacitive plates arranged to provide a capacitive coupling with the first plurality of fixed capacitive plates. The accelerometer has a central member and an outer member fixed to the substrate. According to one embodiment, a plurality of inner support arms extend between the central member and the inertia mass and a plurality of outer support arms extend between the inertia mass and the outer member to support the mass over the cavity. According to another embodiment, one or more cut out apertures are formed in the inertia mass to compensate for a channel and signal line so as to balance the inertia mass about the center of the inertia mass.

28 Claims, 9 Drawing Sheets

U.S. PATENT DOCUMENTS

| | | |
|---|---|---|
| 4,805,456 A | 2/1989 | Howe et al. .................... 73/517 |
| 4,851,080 A | 7/1989 | Howe et al. ................. 156/647 |
| 5,092,174 A | 3/1992 | Reidemeister et al. ........ 73/517 |
| 5,146,389 A | 9/1992 | Ristic et al. ................. 361/283 |
| 5,226,321 A | 7/1993 | Varnham et al. .............. 73/505 |
| 5,233,213 A | 8/1993 | Marek ......................... 257/415 |
| 5,249,465 A | 10/1993 | Bennett et al. ............... 73/510 |
| 5,251,484 A | 10/1993 | Mastache ..................... 73/517 |
| 5,253,526 A | 10/1993 | Omura et al. ................. 73/517 |
| 5,314,572 A | 5/1994 | Core et al. .................. 156/643 |
| 5,345,824 A | 9/1994 | Sherman et al. ............... 73/517 |
| 5,349,858 A | 9/1994 | Yagi et al. ..................... 73/517 |
| 5,388,460 A | 2/1995 | Sakurai et al. ................. 73/517 |
| 5,417,111 A | 5/1995 | Sherman et al. ............... 73/517 |
| 5,540,095 A | 7/1996 | Sherman et al. ............... 71/514 |
| 5,665,915 A | 9/1997 | Kobayashi et al. ............ 73/514 |
| 5,847,280 A | 12/1998 | Sherman et al. ............... 73/514 |
| 6,401,536 B1 * | 6/2002 | O'Brien .................... 73/514.38 |
| 6,508,124 B1 * | 1/2003 | Zerbini et al. ............ 73/514.32 |

* cited by examiner

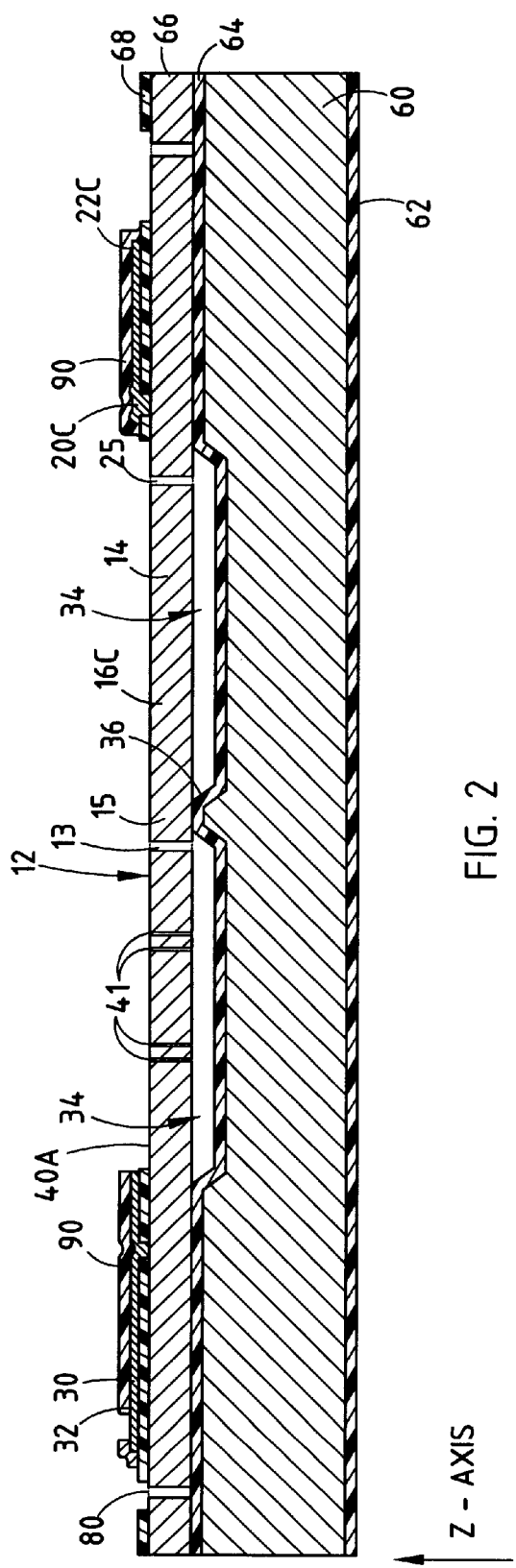
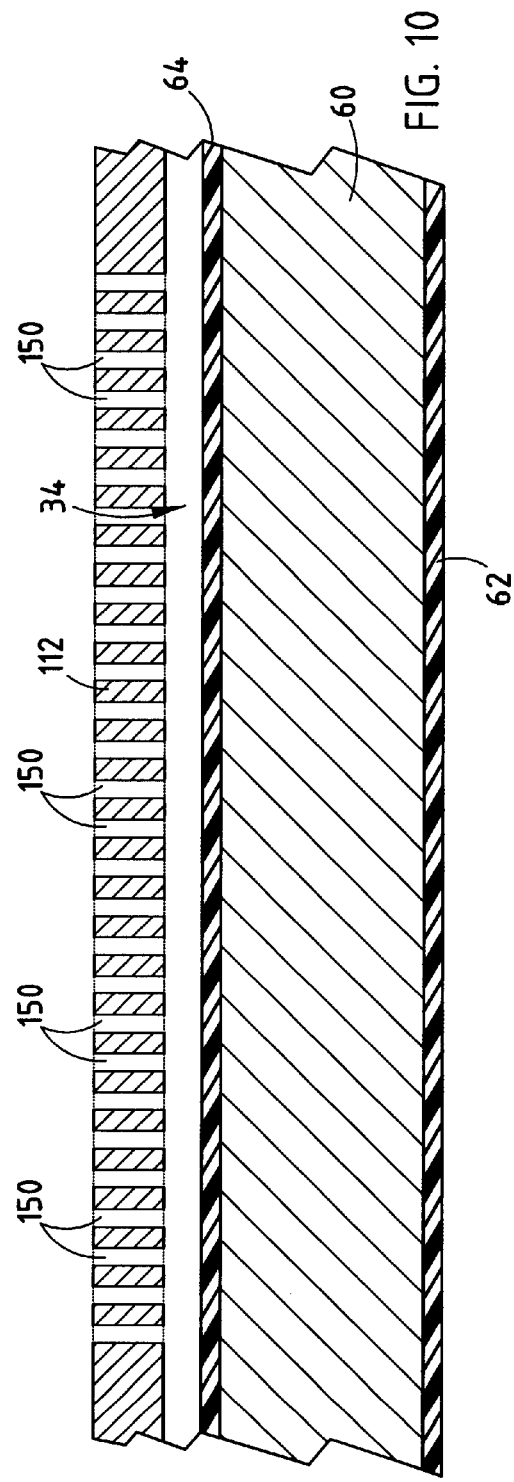

ANGULAR ACCELEROMETER HAVING BALANCED INERTIA MASS

CROSS-REFERENCE TO RELATED APPLICATIONS

This application is related to application Ser. No. 09/782,708 entitled "ANGULAR ACCELEROMETER," filed on Feb. 13, 2001. The aforementioned related application is incorporated herein by reference.

This application is one of two applications filed on the same date, both commonly assigned and having similar specifications and drawings, the other application being identified as U.S. application Ser. No. [Docket No. DP-307092], entitled "BALANCED ANGULAR ACCELEROMETER."

TECHNICAL FIELD

The present invention generally relates to angular accelerometers (i.e., rotational acceleration sensors) and, more particularly, to a balanced microfabricated angular accelerometer.

BACKGROUND OF THE INVENTION

Accelerometers are commonly employed to measure the second derivative of displacement with respect to time. In particular, angular accelerometers measure angular acceleration about a sensing axis. Angular accelerometers are frequently employed to generate an output signal (e.g., voltage) proportional to the sensed angular acceleration for use in vehicle control systems. For example, the sensed acceleration signal may be used to determine a potential vehicle rollover event and to control automotive devices in response thereto. Angular accelerometers may also be used to control a disk drive read/write head such that a control system associated therewith may compensate for severe shock and/or vibrations that cause the angular acceleration.

One approach to determining angular acceleration employs an angular velocity sensor to sense angular velocity, and differentiates the sensed angular velocity to determine the angular acceleration. The design for an angular velocity sensor is generally complex, and angular velocity sensors are typically expensive to produce. In addition, acceleration measuring devices employing an angular velocity sensor typically require a differentiator which adds to the complexity and overall cost of the device.

Another approach for determining angular acceleration uses a combination of two linear accelerometers mounted to a rigid body for sensing linear acceleration along two respective perpendicular axes. Generally, the linear accelerometers each employ a mass suspended from a frame by multiple beams. The mass, beams, and frame act as a spring-mass system, such that the displacement of the mass is proportional to the linear acceleration applied to the frame. The signal extracted from two linear accelerometers can be used to extract angular acceleration information. Linear accelerometers are readily available and easy to use; however, in order to measure angular acceleration while rejecting linear acceleration, the scale factor, i.e., sensitivity or gain, of the two sensors generally must be matched.

A further approach for an angular accelerometer is disclosed in U.S. Pat. No. 5,251,484, entitled "ROTATIONAL ACCELEROMETER," which employs a circular hub centrally supported on a substrate and connected to radially disposed thin film spoke electrodes that flex in response to angular acceleration. Rotational acceleration measurement is achieved by using a differential, parallel plate capacitive pick-off scheme in which the flexible spoke electrodes at the periphery of the fixed disk rotate between fixed reference electrodes so that an off-center position of moving electrodes results in a measured differential voltage from which the disk motion is determined. The sensing capability for such an accelerometer is generally limited to the amount of movement of the flexible spoke electrodes. This cantilevered design with rotary electrodes generally requires high structural matching to ensure predictable gain, phase, and linearity response. The linear and cross-axis sensitivity (gain) is highly dependent on the structural matching. Additionally, separate input and output contacts for each capacitive plate add to the overall complexity and cost of the accelerometer.

More recent designs of angular accelerometers are disclosed in U.S. application Ser. No. 09/410,712, filed on Oct. 1, 1999, and U.S. application Ser. No. 09/782,708, filed on Feb. 13, 2001, both assigned to the assignee of the present application. The microfabricated angular accelerometers disclosed in the aforementioned U.S. patent applications have a rotational inertial mass formed on a substrate and suspended over a cavity via a plurality of support arm tethers. Such accelerometers achieve enhanced sensitivity over previously known accelerometers. However, the design of some angular accelerometers may result in poor linear cross-axis sensitivity on at least one axis, particularly for accelerometers having an asymmetric structure.

Accordingly, many conventional angular accelerometers often suffer from various drawbacks including errors introduced by cross-axis accelerations. It is therefore desirable to provide for a low-cost, easy to make and use, enhanced sensitivity angular accelerometer that eliminates or reduces the drawbacks of the prior known angular acceleration sensing devices, including enhancing the sensitivity of the sensor to structural asymmetries, fabrication processing, packaging, impulsive shocks due to handling, and temperature-induced stresses.

SUMMARY OF THE INVENTION

In accordance with the teachings of the present invention, an angular accelerometer having a balanced inertia mass is provided. The angular accelerometer includes a substrate, a fixed electrode supported on the substrate and including a first plurality of fixed capacitive plates, and a rotational inertia mass suspended over a cavity and including a plurality of movable capacitive plates arranged to provide a capacitive coupling with the first plurality of fixed capacitive plates. The angular accelerometer also includes a central member fixed to the substrate and located substantially in the center of the rotational inertia mass. A channel is formed in the rotational inertia mass, and a signal line extends within the channel formed in the rotational inertia mass. A plurality of support arms extend between the central member and the rotational inertia mass for supporting the rotational inertia mass relative to the fixed electrode and allowing rotational movement of the rotational inertia mass upon experiencing an angular acceleration. The angular accelerometer has one or more openings formed in the rotational inertia mass so as to balance the rotational mass to compensate for the channel and provide a center of mass substantially centered about the rotational inertia mass.

In the disclosed embodiment, an input is electrically coupled to one of the fixed electrodes and the rotational inertia mass for receiving an input signal, and an output is electrically coupled to the other of the fixed electrode and the rotational inertia mass for providing an output signal which varies as a function of change of the capacitive coupling and is indicative of angular acceleration. The balanced rotational inertia mass equalizes the frequencies of the orthogonal mode, which in turn significantly improves the cross-axis response to the structure. The balanced inertia mass further offers a processing benefit in that the one or more etched openings formed in the inertia mass may facilitate cavity venting prior to the release of the structure.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 2 is a cross-sectional view of the angular accelerometer taken through lines II—II of FIG. 1;

FIG. 10 is a cross-sectional view taken through lines X—X of FIG. 9; and

DESCRIPTION OF THE PREFERRED EMBODIMENTS

Figure 1:
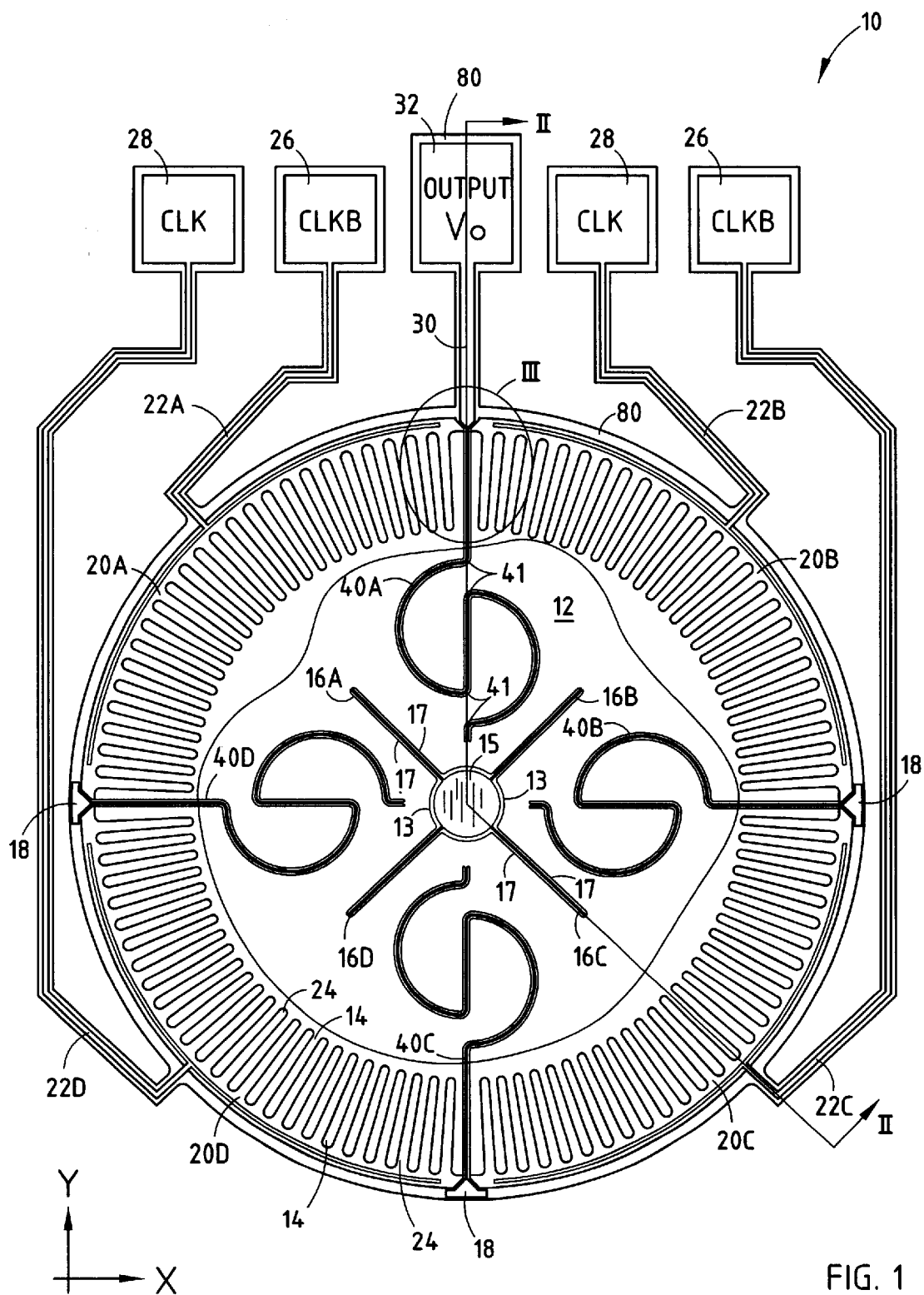
FIG. 1 is a top view of an angular accelerometer formed on a substrate according to a first embodiment of the present invention.

Referring to FIGS. 1 and 2, an angular accelerometer 10 is illustrated according to a first embodiment of the present invention for sensing angular acceleration about the Z-axis extending perpendicular to a plane defined by the X-Y-axes. The angular accelerometer 10 senses angular acceleration about the sensing Z-axis, while preventing the sensing of linear and angular off-axis accelerations along non-sensing axes. The angular accelerometer 10 is a micromachined accelerometer having a rotational inertial mass and supporting structure which minimizes the sensitivity of the microsensor to structural asymmetries, fabrication processing, packaging, impulse shocks due to handling, and temperature-induced stresses. Additionally, the angular accelerometer 10 has high sensitivity due to high mechanical gain, and thus is less sensitive to noise interference such as electromagnetic interference (EMI).

The angular accelerometer 10 is fabricated on a single-crystal silicon substrate 60 using a trench etching process. The trench etching process may include etching out a pattern from a doped material suspended over a cavity 34 to form a conductive pattern that is partially suspended over the cavity 34. One example of an etching process that may be used to form the angular accelerometer 10 of the present invention is disclosed in commonly assigned application Ser. No. 09/410,713, filed on Oct. 1, 1999, entitled "MEMS STRUCTURE AND MICROFABRICATION PROCESS," which is incorporated herein by reference. While the angular accelerometer 10, as described herein, is fabricated on a single-crystal silicon substrate using a trench etching process, it should be appreciated that the angular accelerometer 10 could be fabricated using other known fabrication techniques, such as: an etch and undercut process; a deposition, pattern, and etch process; and an etch and release process, without departing from the teachings of the present invention.

The angular accelerometer 10 includes a rotational inertia mass 12 suspended over cavity 34 above substrate 60. Rotational inertia mass 12 is generally shown configured in the shape of a circular annular ring having a circular central opening in the center region. However, it should be appreciated that rotational inertia mass 12 may be configured in various other shapes and sizes without departing from the teachings of the present invention. A stationary central member 15 is trench-etched from the mass 12 and is fixedly attached to the underlying substrate 60 via oxide layer 64, centered within the circular opening of the rotational inertia mass 12. The rotational inertial mass 12 has a plurality of rigid comb-like conductive fingers 14 extending radially outward from the outer peripheral edge to serve as movable capacitive plates. The rotational inertia mass 12 with comb-like conductive fingers 14, is a movable mass that is rotatable angularly about the Z-axis, when subjected to an angular acceleration about the Z-axis. For purposes of discussion herein, the X-Y plane is defined as the plane formed by the X-axis and the Y-axis as oriented in FIG. 1, while the Z-axis is defined as the axis which extends perpendicular to the X-Y plane as shown in FIG. 2.

The rotational inertia mass 12 is suspended above cavity 34 via four inner support arms (i.e., tethers) 16A–16D connected to the stationary central member 15 and four outer support arms (i.e., tethers) 40A–40D connected to a stationary outer member. According to the embodiment shown, the stationary outer member includes isolators 18 and output line 30 which are fixed to the substrate. Accordingly, the rotational inertia mass 12 is supported both on the inside via the fixed central member 15 and on the outside via the fixed outer member, shown as isolators 18 and line 30. According to the first embodiment shown and described herein, the four inner support arms 16A–16D are equiangularly spaced from one another by ninety degrees (90°). In addition, the four outer support arms 40A–40D are likewise equiangularly spaced from one another by ninety degrees (90°), and are angularly offset forty-five degrees (45°) relative to the orientation of the inner support arms 16A–16D. While four inner support arms 16A–16D and four outer support arms 40A–40D are shown and described herein, it should be appreciated that any number of a plurality of support arms may be employed for each the plurality of inner and outer support arms in accordance with the teachings of the present invention, such as eight, twelve, or sixteen support arms. However, it is preferred, but not required, that the angular accelerometer 10 contain an even number of inner and outer support arms.

The inner support arms 16A–16D are integrally formed as radial extensions connecting the annular ring-shaped inertia mass 12 to the fixed central member 15. A pair of parallel trench-etched slots (trenches) 17 are etched in the rotational inertial mass 12 to form each of the inner radial support arms 16A–16D. The slots 17 extend through the entire depth of the inertial mass 12 and, in effect, result in slots 17 formed on opposite sides of each of inner support arms 16A–16D. The slots 17 extend from the inner edge defining the central opening in the inertial mass 12 radially outward to a location where the corresponding support arm is connected to the inertial mass 12. The slots 17 form air gaps which allow the inner support arms 16A–16D to be connected at a location further radially outward from the inner edge, thereby providing for an increased effective overall length and greater angular flexibility of the support arms 16A–16D.

The outer support arms 40A–40D are integrally formed as extensions connecting the annular ring-shaped inertia mass 12 to a stationary outer member fixed to the substrate. The stationary outer member is shown including three isolators 18 and output signal line 30, all of which are fixed to the substrate. The three isolators 18 are connected to support arms 40B–40D, while support arm 40A is connected to output signal line 30. It should be appreciated that the stationary outer member may include other stationary members which are fixed relative to the substrate. A pair of parallel trench-etched slots (trenches) 41 are etched in the inertia mass 12 to form each of the outer support arms 40A–40D. The slots 41 extend through the entire depth of the inertial mass 12 and, in effect, result in slots 41 formed on opposite sides of each outer support arm 40A–40D which allows the outer support arms 40A–40D to be connected at a location radially inward from the outer perimeter, thereby providing for an increased effective overall length and greater flexibility of the outer support arms 40A–40D. According to the first embodiment shown, the outer support arms 40A–40D each include a pair of folded semi-circular portions which provide an increased overall effective length, thus increasing flexibility and compliance, and reducing stiffness of the support arm. The outer support arm 40A, in addition to supporting the rotational inertia mass 12, provides a conductive path for transmitting an output electrical signal from rotational inertia mass 12 and movable capacitive plates 14 to output signal line 30.

The inner and outer support arms 16A–16D and 40A–40D, respectively, are flexible beams that act as springs which are compliant to bending perpendicular to the longitudinal axis of the beam in the X-Y plane, but are relatively stiff to bending out of the X-Y plane in the direction of the Z-axis. The support arms 16A–16D and 40A–40D preferably have a thickness (depth) in the range of three to two hundred micrometers, and a width in the range of one to twenty micrometers. According to one example, support arms 16A–16D and 40A–40D may have a thickness of approximately thirty microns as compared to a width of approximately five microns to provide sufficient aspect ratio of thickness-to-width to allow for flexibility in the X-Y plane and stiffness in the Z-axis.

Together, the four inner support arms 16A–16D and the four outer support arms 40A–40D symmetrically suspend the rotational inertia mass 12 above cavity 34 in the X-Y plane, and yet allow angular rotation about the Z-axis when subjected to angular acceleration about the Z-axis. The rotational inertia mass 12 and support arms 16A–16D and 40A–40D are symmetric with respect to an axis passing through the center of the central member 15, and thus the angular accelerometer 10 is electrically and physically balanced. By employing at least two orthogonal pairs of opposing inner support arms 16A–16D and at least two orthogonal pairs of opposing outer support arms 40A–40D, the entire structure is symmetric and is stiff with respect to linear accelerations in the X-Y plane. Yet, the rotational inertia mass 12 is free to rotate with good sensitivity about the Z-axis within the constraints of the inner and outer radial support arms.

Fixed to a thick oxide insulation layer 64 on top of substrate 60 are four fixed electrodes 20A–20D, each having a plurality of fixed capacitive plates 24 interdisposed between adjacent movable capacitive plates 14, to form four banks of variable capacitors. The first fixed electrode 20A has a clock input line 22A for receiving a square wave clock signal CLKB 26. The plurality of fixed capacitive plates 24 provided with the first fixed electrode 20A are interdisposed between adjacent movable capacitive plates 14 of rotational inertia mass 12 for approximately one-quarter rotation (i.e., a ninety degree window) of inertia mass 12, to provide a first bank of capacitors. The second fixed electrode 20B likewise has a plurality of fixed comb-like capacitive plates 24 interdisposed between adjacent movable capacitive plates 14 of inertial mass 12 for approximately one-quarter of its rotation, to provide a second bank of capacitors. The second fixed electrode 20B has a clock input 22B for receiving a square wave clock signal CLK 28. The third fixed electrode 20C also includes a plurality of fixed comb-like capacitive plates 24 for approximately one-quarter of movable capacitive plates 14 of inertia mass 12, to provide a third bank of capacitors, and likewise receives clock signal CLKB 26 via input line 22C. The fourth fixed electrode 20D has a plurality of fixed capacitive plates 24 for approximately the remaining one-quarter of the movable capacitive plates 14 of inertia mass 12, to provide a fourth bank of capacitors, and receives clock signal CLK 28 via clock input line 22D. It should be appreciated that the number of fixed electrodes can be increased to multiples of four, as represented by equation 4×N, where N=1, 2, 3, 4, etc., which may advantageously provide for good matching and cross-axis rejection.

Each of the fixed electrodes 20A–20D are formed near the outer perimeter of the rotational inertia mass 12 extending through an angular rotation of approximately ninety degrees (90°). Adjacent fixed electrodes 20A–20D are dielectrically isolated from one another via trenches 41 which form isolators 18 and output line 30. Each isolator 18 has surrounding slots that serve to provide a dielectric air gap. The fixed electrodes 20A–20D and corresponding plurality of fixed capacitive plates 24 are fixed in place supported on top of insulation layer 64 and substrate 60. Additionally, each fixed electrode has an arcuate conductive strip formed on top thereof and connected to corresponding input lines 22A–22D to enhance the signal transmission. The rotational inertia mass 12 and its rigid outer peripheral capacitive plates 14 are able to move relative to fixed capacitive plates 24 in response to a rotational acceleration experienced about the Z-axis.

The rotational inertia mass 12 and movable capacitive plates 14 are electrically conductive and are electrically coupled to output pad 32 via support arm 40A and output signal line 30 for providing an output charge $V_O$. The output charge $V_O$ is processed to determine a voltage indicative of the angular rotation of the rotational inertia mass 12 relative to the fixed electrodes 20A–20D due to angular acceleration about the Z-axis. Accordingly, by measuring the output charge $V_O$ at output pad 32, the angular accelerometer 10 provides an indication of the angular acceleration experienced about the Z-axis.

With particular reference to the cross section shown in FIG. 2, the angular accelerometer 10 includes substrate 60 which serves as the underlying support. Substrate 60 may include a silicon or silicon-based substrate having the thick oxide insulation layer 64 formed on the top surface, and a bottom oxide insulation layer 62 formed on the bottom surface. The substrate 60 may include silicon, or alternative materials such as glass or stainless steel, for example. The substrate 60 and oxide insulation layer 64 are configured to provide a cavity 34 below the rotational inertia mass 12. Additionally, substrate 60 and oxide layer 64 form a central pedestal 36 below the fixed central member 15 for purposes of fixing the central member 15 in place relative to the substrate 60. Central pedestal 36 also provides structural support during the fabrication process.

Formed above the substrate 60 and on top of insulation layer 64 is an EPI layer 66. EPI layer 66 is made of a conductive material and is etched to form various components including the rotational inertia mass 12, central member 15, isolating trenches 80, air gaps 25, and other elements that support or isolate conductive signal paths. Trenches 80 and air gaps 25 provide physical and electrical isolation between adjacent elements. The EPI layer 66 may have a thickness in the range of three to two hundred micrometers. With the main exception of the rotational inertia mass 12 and central member 15, the EPI layer 66 further includes a field passivation layer 68 disposed on the top surface thereof. The conductive signal paths of electrodes 20A–20D, lines 22A–22D, and data line 30 are formed on top of the dielectric field passivation layer 68 as shown to provide signal transmission paths. In addition, a passivation layer 90 is formed over each of these signal paths.

It should be appreciated that the angular accelerometer 10 may be formed by disposing the EPI layer 66 and insulation field passivation layer 68 on top of substrate 60. Prior to the etching process, the central pedestal 36 provides structural support for EPI layer 66 to allow the central member 15 to be fixedly provided on top thereof. By providing a central pedestal 36, the structural integrity of the accelerometer 10 is enhanced during the fabrication process. After the etching process, the central pedestal 36 supports the central member 15 which, in turn, partially supports the rotational inertia mass 12 via inner support arms 16A–16D. By supporting the EPI layer 66 in the central region during the manufacturing process, the maximum stress experienced is greatly reduced. This allows the use of larger cavity sizes for a given thickness of EPI layer 66, resulting in greater sensitivity and signal-to-noise ratio.

Figure 3:
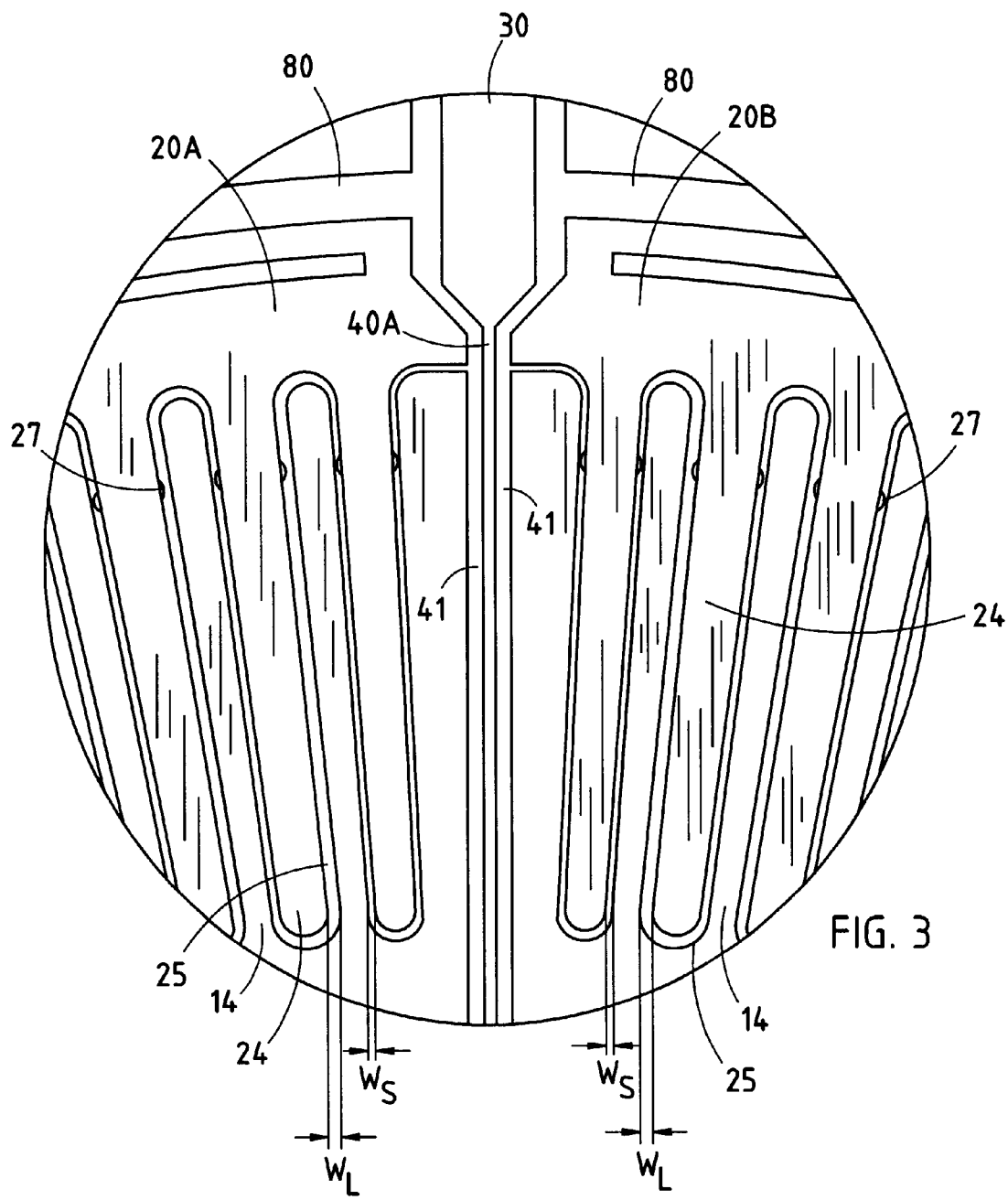
FIG. 3 is an enlarged view of section III of FIG. 1.

Referring to FIG. 3, a portion of the angular accelerometer 10 is further illustrated in greater detail. Outer support arm 40A and signal line 30 extend within a pair of parallel radial slots 41 formed through the entire depth of rotational inertia mass 12 to provide an electrical path between the rotational inertia mass 12 and output pad 32. The slots 41 provide dielectric isolation between each of the data line 30 and support arm 40A and rotational inertial mass 12, as well as between adjacent fixed electrodes 20A and 20B while allowing the rotational inertia mass 12 to rotate within limits imposed by the inner and outer support arms. Trenches 80 isolate the fixed electrodes from the outer surrounding elements.

The fixed capacitive plates 24 are interdisposed between adjacent movable capacitive plates 14 and separated from one another via an air gap 25. The air gap 25 between capacitive plates 14 and 24 allows for movable capacitive plates 14 to move relative to the fixed capacitive plates 24. Each of the movable capacitive plates 14 has a very small mass as compared to the rotational inertia mass 12, and are rigid to prevent rotary movement relative to rotational inertia mass 12. Additionally, the movable and fixed capacitive plates 14 and 24, respectively, each has a thickness equal to the thickness of the EPI layer 66. Because total change in capacitance is proportional to the thickness of the capacitive plates 14 and 24, the signal-to-noise ratio is enhanced with enlarged thickness.

The air gap 25 between capacitive plates 14 and 24 is greater on one side of plate 14 as compared to the opposite side. For example, on the bank of capacitors formed by electrode 20B, the width $W_L$ of air gap 25 between capacitive plates 14 and 24 is approximately twice the width $W_S$. The air gap 25 between adjacent pairs of capacitive plates 14 and 24 is configured substantially the same for each of the fixed capacitive plates 24 connected to the fixed electrode. However, for adjacent fixed electrodes 20A and 20B, the orientation of the capacitive plates 14 and 24 is switched in that the larger air gap width $W_L$ and smaller gap width $W_S$ of air gap 25 is on the opposite side as compared to the adjacent fixed electrodes. For example, the fixed capacitive plates 24 on fixed electrode 20A are separated from movable capacitive plates 14 by an air gap 25 of width $W_L$ twice as wide on the left side of capacitive plates 14 as the width $W_S$ on the right side of capacitive plates 14, while fixed electrode 20B is configured with a larger air gap width $W_L$ on the right side of capacitive plates 14 as compared to its left side.

Additionally, each of the fixed capacitive plates 24 may include enlarged motion stop beads 27 for limiting the relative movement between capacitive plates 14 and 24 in the event excessive angular acceleration is experienced. Motion stop beads 27 can be formed on either or both of the movable and fixed capacitive plates 14 and 24, respectively.

The angular accelerometer 10 is shown and described in connection with four banks of variable capacitors formed by capacitive plates 14 and 24. The capacitive plates 24 associated with fixed electrodes 20A and 20C have a certain positive-to-negative orientation with respect to movable capacitive plates 14. In contrast, the positive-to-negative orientation between capacitive plates 14 and 24 for the fixed electrodes 20B and 20D are arranged oppositely of the adjacent fixed electrode. By alternating the orientation of the plurality of four banks of capacitors in the four equiangular sections as disclosed, the angular accelerometer 10 essentially nulls out any cross-axis acceleration and linear acceleration, and allows for angular acceleration to be sensed about the Z-axis. Further, by employing a plurality of fixed capacitive plates 24 commonly connected to fixed electrodes 20A–20D, a reduced number of signal input and output lines is achieved.

Figure 4:
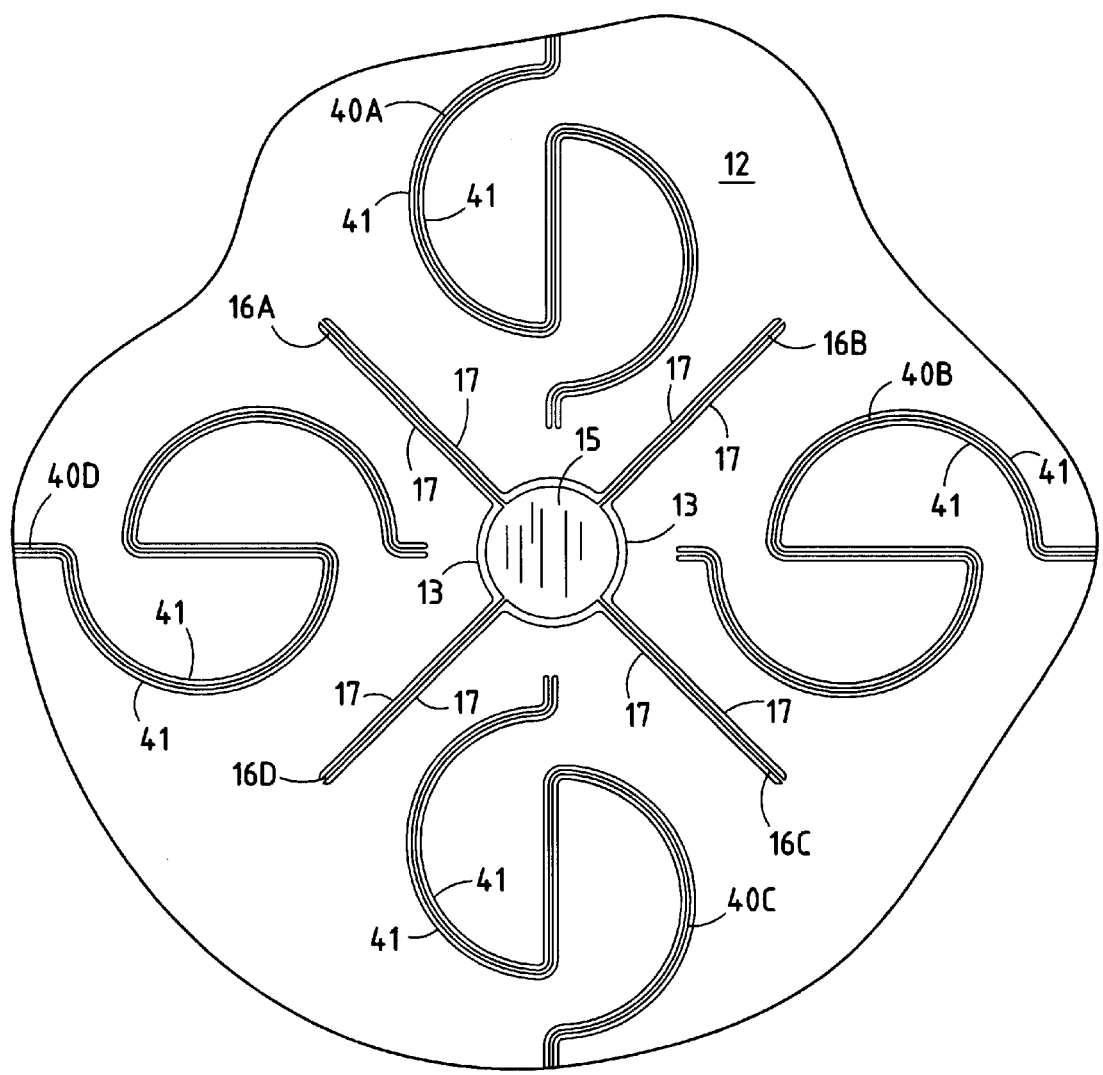
FIG. 4 is an enlarged view of section IV of FIG. 1.

Referring to FIG. 4, another enlarged portion of the inertial mass 12 of angular accelerometer 10 is illustrated in greater detail. Each of the radial inner support arms 16A–16D is formed as a continuous conductive line which extends from the fixed central member 15 to the rotational inertia mass 12 at a location displaced radially outward from the central member 15. Inner support arms 16A–16D each provide a tether connection between central member 15 and rotational inertia mass 12. Support arms 16A–16D are formed by etching to remove material to form the bordering slots 17. Support arms 16A–16D flex within slots 17 to allow rotational movement of the rotational inertia mass 12 relative to the central member 15. Accordingly, support arms 16A–16D provide rigid vertical support in the Z-axis, while allowing for angular rotation about the vertical Z-axis.

Each of the outer support arms 40A–40D is likewise formed as a continuous conductive line which extends from the stationary outer member, shown as isolators 18 and line 30 fixed to the substrate, to the rotational inertia mass 12 at a location displaced radially inward from the outer peripheral edge thereof. Outer support arms 40A–40D each provide a tether connection between the fixed outer member and the rotational inertia mass 12. It should be appreciated that outer support arm 40A is formed of a continuous conductive signal line which, in addition to physically supporting the rotational inertia mass 12, also transmits electrical signals to output line 30. Outer support arms 40A–40D are formed by etching to remove material to form the bordering slots 41. Outer support arms 40A–40D flex within slots 41 to allow movement of the rotational inertia mass 12 relative to the substrate. Accordingly, outer support arms 40A–40D also provide rigid vertical support in the Z-axis, while allowing for angular rotation of the inertia mass 12 about the vertical Z-axis.

The central member 15 is separated from the inner circular edge at the central opening of ring-shaped rotational inertia mass 12 via air gap 13. Air gap 13 is formed as a set of arc-shaped slots between adjacent inner support arms 16A–16D by etching away material from the EPI layer forming inertia mass 12 and central member 15 through the complete depth to form a set of segmented circular slots having width of preferably at least the width $W_S$. According to one example, air gap 13 has a width of approximately five microns. The air gap 13 has a width sufficiently large to allow the rotational inertia mass 12 to rotate relative to the central member 15 without interference, yet is small enough to allow for a large surface area of the ring-shaped inertia mass 12.

Figure 5:
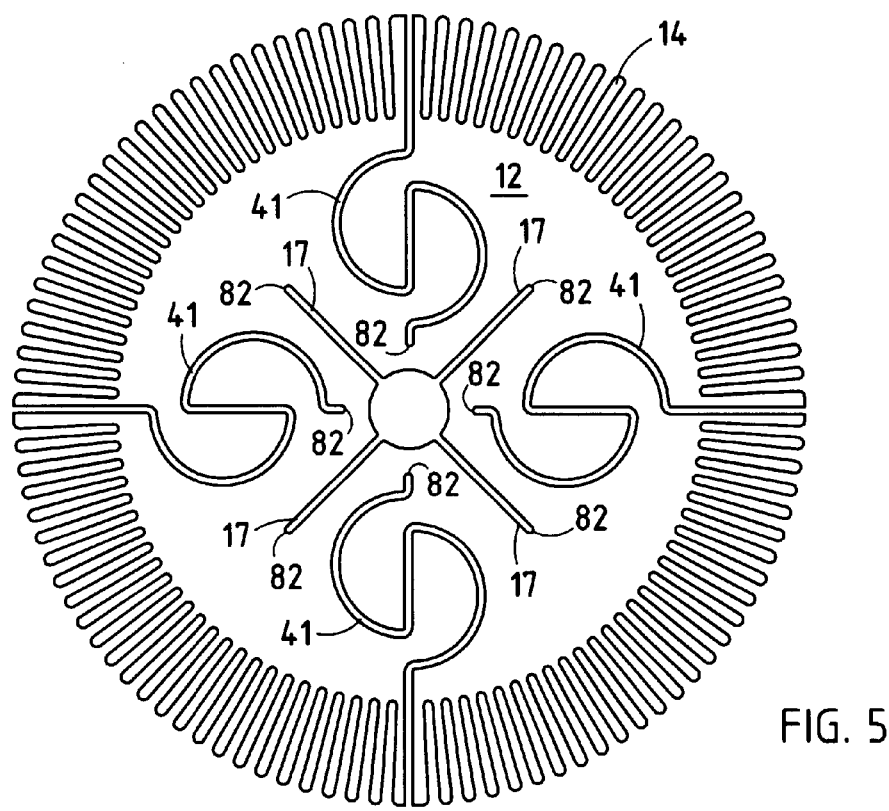
FIG. 5 is a top view of the rotational inertia mass shown removed from the angular accelerometer of FIG. 1.

The rotational inertia mass 12 is further shown in FIG. 5, with the inner support arms 16A–16D, outer support arms 40A–40D, and central member 15 removed. Rotational inertia mass 12 includes slots 41, each shown as a single slot, with the corresponding outer support arms 40A–40D removed, formed through the entire depth and extending inward from the outer perimeter for defining an opening in which the outer support arms 40A–40D are disposed. In addition, radial slots 17 extend from the central opening defined by air gap 13 to a location radially outward for providing an opening within which the corresponding inner support arms 16A–16D are located and capable of flexing. The rotational inertia mass 12 as shown is ring-shaped in that the central region has a generally circular opening to receive central member 15 and air gap 13.

Figure 6:
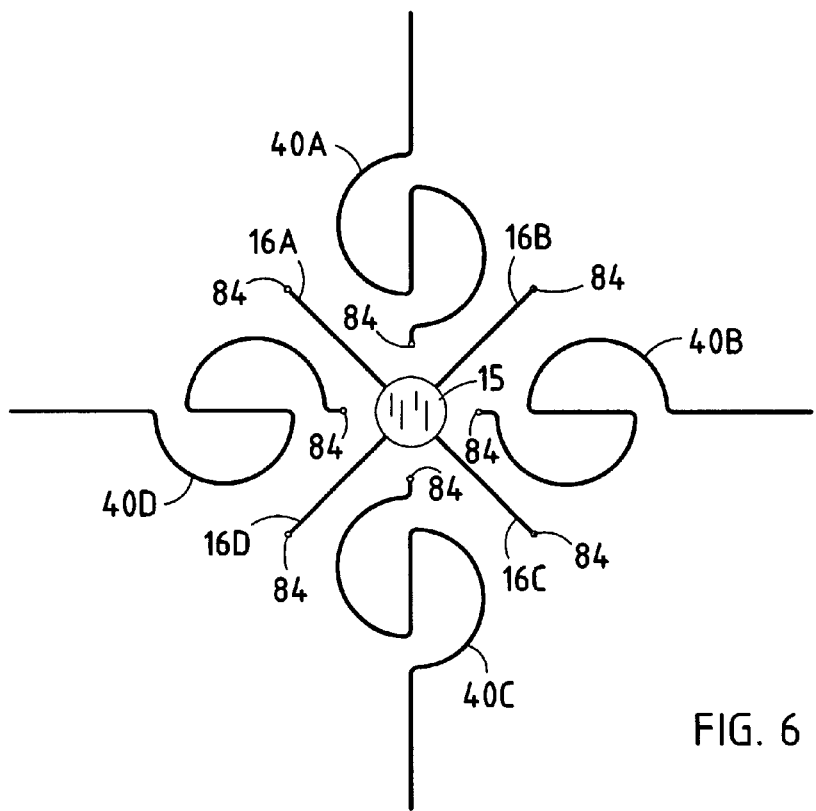
FIG. 6 is a top view of the central member and support arms shown removed from the angular accelerometer of FIG. 1.

The inner support arms 16A–16D, outer support arms 40A–40D, and central member 15 are further illustrated in FIG. 6, removed from the rotational inertia mass 12. As can be seen in FIGS. 5 and 6, the central member 15, inner support arms 16A–16D and outer support arms 40A–40D, fit within slot 13, slots 17, and slots 41, respectively, of the rotational inertia mass 12. One end 84 of each of support arms 16A–16D and 40A–40D is integrally attached to rotational inertia mass 12 at a location 82 shown in FIG. 5.

Figure 7:
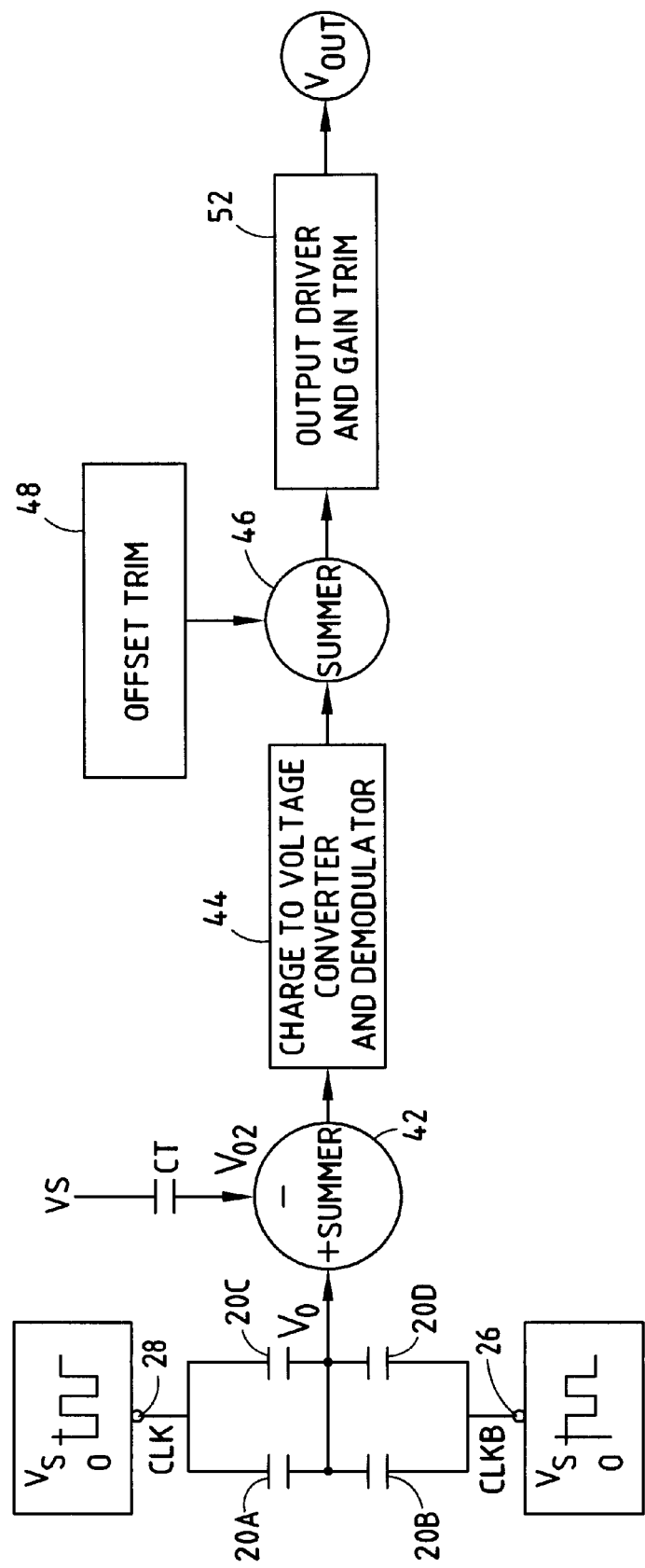
FIG. 7 is a block/circuit diagram illustrating processing circuitry coupled to the angular accelerometer.

Referring to FIG. 7, processing of the signals applied to and sensed with the angular accelerometer 10 is illustrated according to one embodiment. The fixed electrodes 20A–20D are generally shown receiving clock signal CLKB at pad 26 and signal CLK at pad 28. Clock signals CLKB and CLK may be rectangular (e.g., square), wave-generated signals that have alternating voltage levels of $V_S$ and zero volts or $+V_S$ and $-V_S$. Clock signal CLKB is one hundred eighty degrees (180°) out of phase, i.e., inverse, as compared to clock signal CLK, and therefore provides an opposite phase rectangular waveform. The processing circuitry includes a summer 42 for receiving the output voltage $V_O$ on pad 32 and a voltage $V_{O2}$ received from the summation of the capacitors, represented herein as CT, when a voltage source $V_S$ is applied thereto. Voltage $V_{O2}$ contains externally induced noise (e.g., EMI and/or RFI noise) present in the sensed signal, and summer 42 subtracts the noise from the output charge $V_O$. The output of summer 42 is applied to a charge-to-voltage converter and demodulator 44 which converts the processed charge to a voltage signal. The voltage signal is then input to a summer 46 which receives a signal from an offset trim 48. The offset trim 48 provides a signal which compensates for bias and bias drift, including bias drift due to temperature variations. Accordingly, summer 46 sums the trim signal with the voltage output so as to compensate for bias errors. The bias compensated voltage is then applied to an output driver and gain trim 52 which rescales the voltage to within a desired range and produces the output signal $V_{OUT}$. It should be appreciated that the output signal $V_{OUT}$ may be further processed via further control circuitry, such as a microprocessor-based controller, to perform various control functions.

In operation, the angular accelerometer 10 provides a measurement of the angular acceleration about the Z-axis, while being non-responsive to cross-angular accelerations and linear accelerations. In doing so, the rotational inertia mass 12, when subjected to an angular acceleration about the Z-axis, rotates about the Z-axis relative to the fixed electrodes 20A–20D and within the restraining limits of the support arms 16A–16D and 20A–20D. If the rotational inertia mass 12 is rotated in a positive direction about the Z-axis, the opposing banks of variable capacitors formed by fixed electrodes 20A and 20C increase in capacitance, while the opposing banks of variable capacitors formed by electrodes 20B and 20D decrease in value, or vice versa. The change in capacitance provides the output signal $V_O$ indicative of the angular acceleration experienced. Since inner support arms 16A–16D and outer support arms 40A–40D are integrally formed within slots 17 and 41, respectively, in the rotational inertia mass 12, and are attached to the fixed central member 15 and the outer member, susceptibility to damage by external shock is thus reduced.

Figure 8:
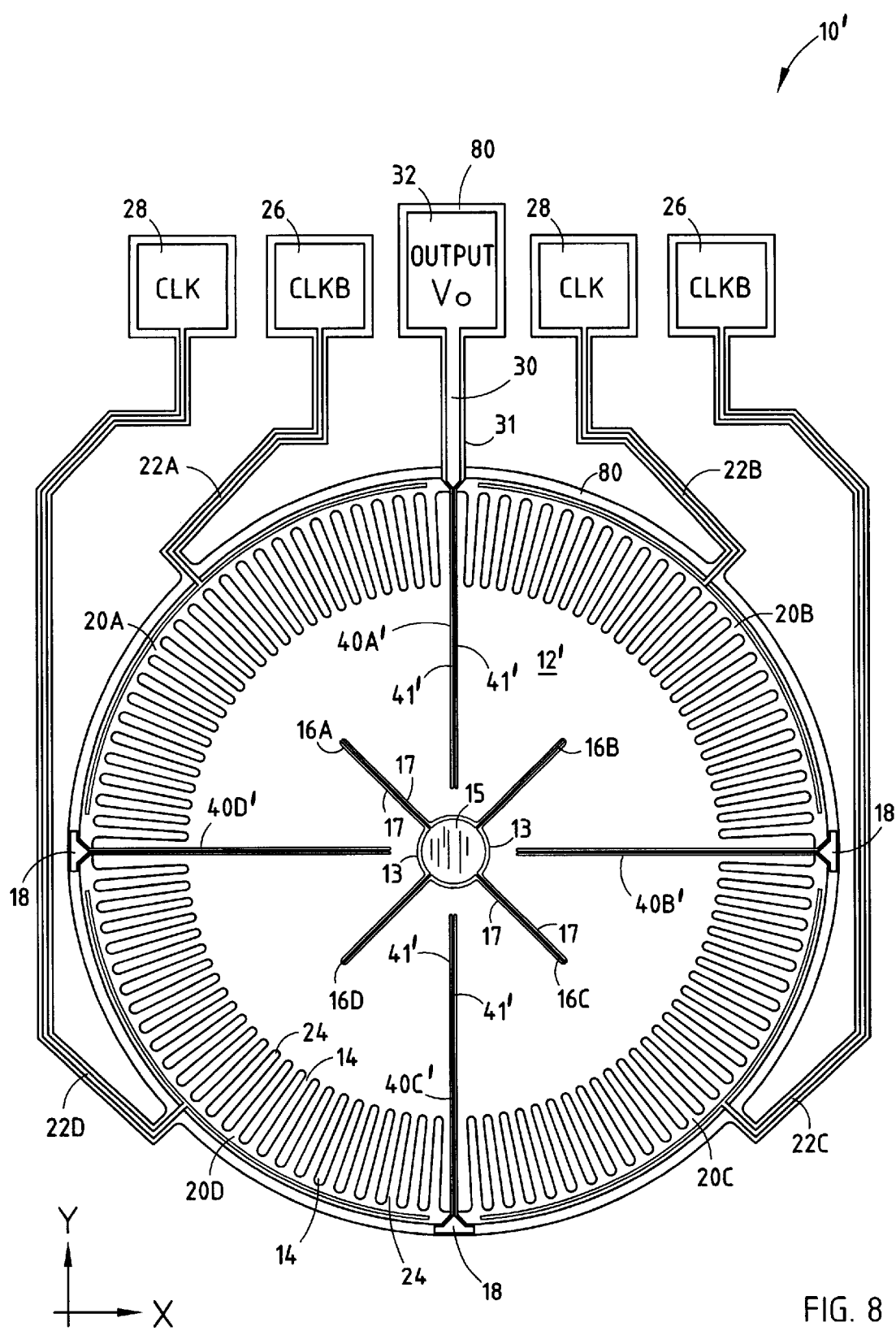
FIG. 8 is a top view of an angular accelerometer having alternative outer support arms according to a second embodiment of the present invention.

Referring to FIG. 8, an angular accelerometer 10' is shown having outer radial support arms 40A'–40D' according to a second embodiment of the present invention. In contrast to the outer support arms having folded semicircular portions in the first embodiment, the outer radial support arms 40A'–40D' of the second embodiment are formed as straight arms extending radially outward. The outer radial support arms 40A'–40D' are each bounded on opposite sides by straight slots 41'. Accordingly, the rotational inertia mass 12' is symmetrically supported by straight radial inner and outer support arms 16A–16D and 40A'–40D', respectively. While the inner support arms 16A–16D and outer support arms 40A–40D and 40A'–40D' have been shown and described herein in connection with straight line and folded semi-circular configurations, it should be appreciated that the inner and outer support arms may be configured in various sizes, shapes, and numbers, without departing from the teachings of the present invention.

Figure 9:
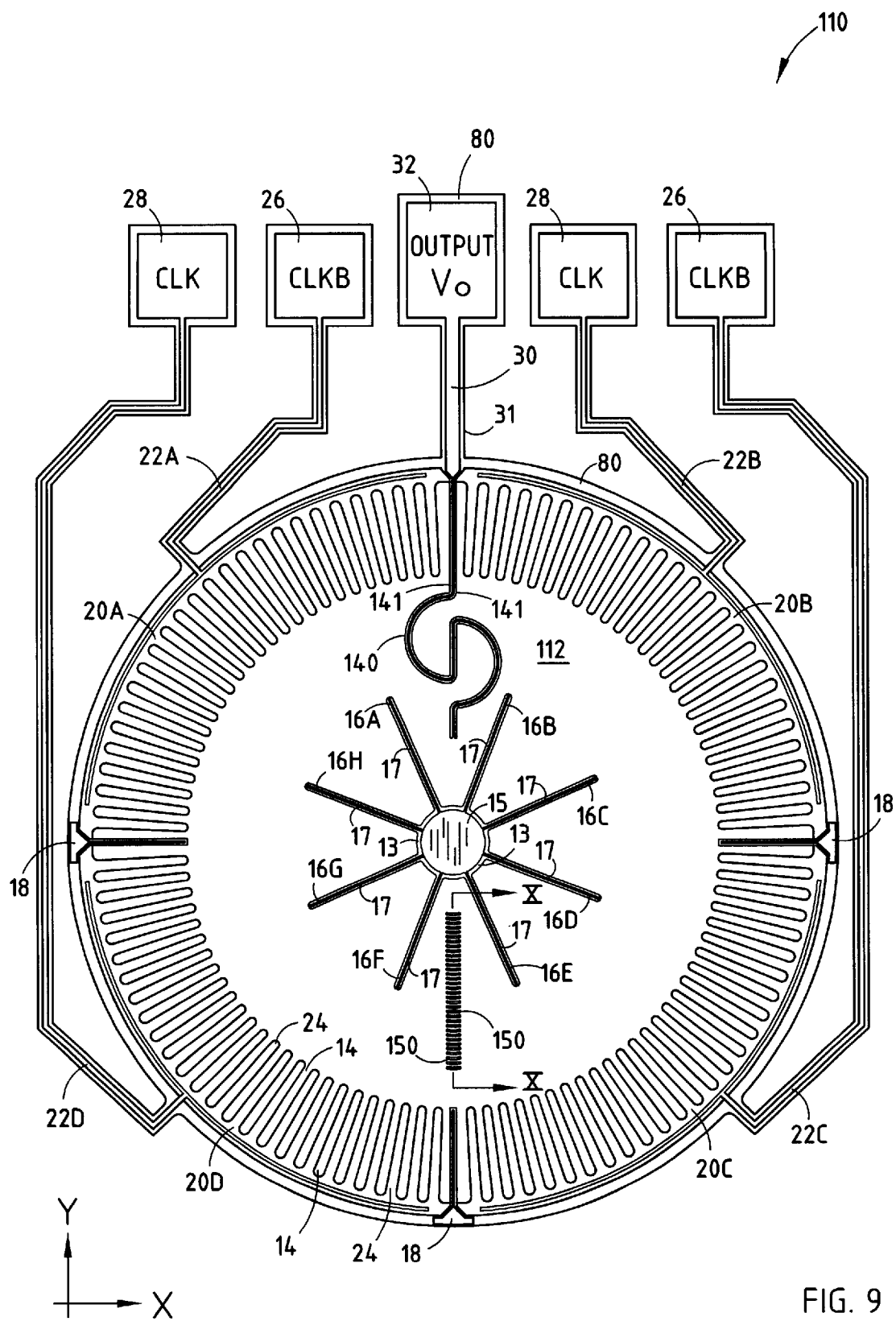
FIG. 9 is a top view of an angular accelerometer having a balanced inertial mass according to a third embodiment of the present invention.

Referring to FIG. 9, an angular accelerometer 110 is shown having a signal line 140 and cut out apertures 150 formed in a rotational inertia mass 112 to achieve a centrally balanced inertia mass 112 according to a third embodiment of the present invention. The angular accelerometer 110 includes a rotational inertia mass 112 which is generally asymmetric, in contrast to the above-described first and second embodiments of angular accelerometers 10 and 10'. Angular accelerometer 110 employs similar features described in connection with the angular accelerometer 10, and thus identical reference numerals are used to identify identical features. It should also be appreciated that the angular accelerometer 110 may be manufactured according to the techniques described above in connection with the manufacture of the angular accelerometer 10.

The angular accelerometer 110 employs a plurality of inner support arms 16A–16H which connect the rotational inertia mass 112 to the central member 15, as explained above. In addition, the angular accelerometer 110 employs a conductive signal output line 140 extending from the rotational inertia mass 112 to the output signal line 30. The conductive signal line 140 integrally attaches to rotational inertia mass 112 at a location radially inward from the outer perimeter thereof. In this third embodiment of angular accelerometer 110, no further conductive signal lines or outer support arms are connected to the outer member or other peripheral members. Instead, the single conductive line 140 conducts electrical signals from the rotational inertia mass 112 to the output signal line 30. The conductive element 140 is formed similar to support arm 40A (FIG. 1) by forming slots 141 on opposite sides of the conductive element 140 so as to allow the conductive element 140 to flex during angular rotation of the rotational inertia mass 112.

It should be appreciated that the presence of a single conductive element 140 and bordering slots 141 results in an asymmetric rotational inertia mass which, for a constant thickness inertia mass 112, cause an imbalance of the rotational inertia mass 112 relative to the center of central member 15. By removing material from mass 112 to form slots 141, a reduction in the weight of the mass 112 on one side is created, thus resulting in the imbalance. The presence of the imbalance created by the asymmetric design may result in reduced sensitivity to linear cross-axis accelerations, at least for one of the axis.

The angular accelerometer 110, according to the third embodiment of the present invention, employs one or more cut out apertures 150 formed in the rotational inertia mass 112 to balance the rotational inertia mass to cause the center of mass of the rotational inertia mass 112 to be substantially centered at the center of the rotational inertia mass 112. The cut out apertures 150 are formed by etching or otherwise removing material opposite the side of the slots 141 and conductive signal line 140 and are sized to compensate for the imbalance created by forming slots 141 and conductive signal line 140 in the opposite side of rotational inertia mass 112. Referring to FIG. 10, the plurality of cut out openings (apertures) 150 are shown extending completely through the rotational inertia mass 112. However, it should be appreciated that the cut out openings may extend completely or partially within mass 112. It should also be appreciated that the number of cut out apertures 150 may include any number having a size sufficient to balance the rotational inertia beam 112 to provide the center of mass about the center of the inertia mass 112. Additionally, the location of the cut outs apertures 150 is preferably alone an axis opposite the slots 141.

By providing mass balancing of the rotational inertia mass 112, an equalization of the frequencies of the orthogonal mode is realized which, in turn, significantly improves the cross-axis responses of the structures. The mass balancing also introduces a process benefit in that the cut out openings 150 in the rotational inertia mass 112 may facilitate cavity venting prior to the release of the fine structural geometries. This further prevents excessive finger motions and hence the comb-like fingers from structural damage during a venting event.

Figure 11:
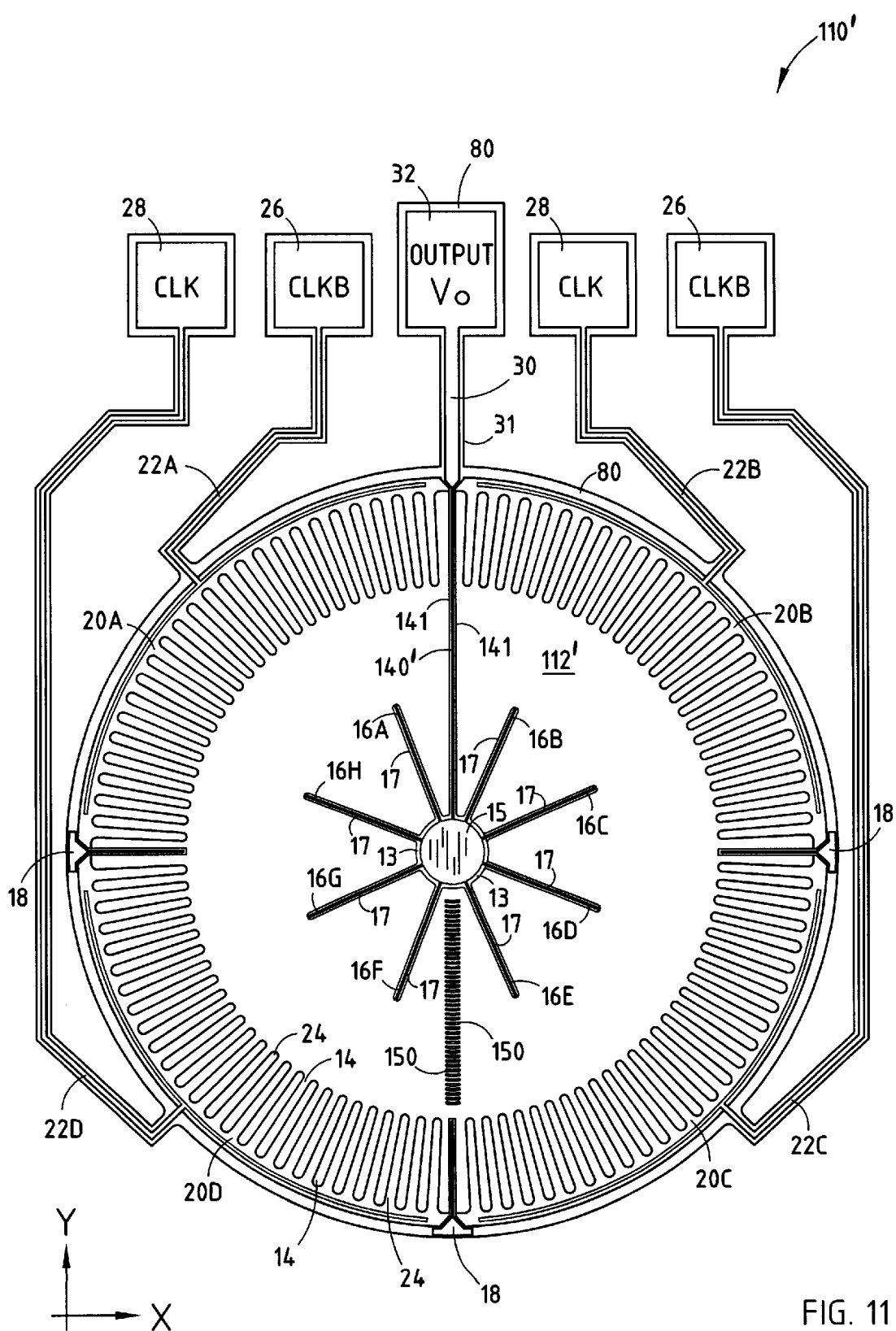
FIG. 11 is a top view of an angular accelerometer having a balanced inertial mass and an alternative signal line according to a fourth embodiment of the present invention.

Referring to FIG. 11, an angular accelerometer 110' is shown having a radial conductive element 140' and cut out apertures 150 according to a fourth embodiment of the present invention. Conductive element 140' is shown as a radially straight line extending from the central member 15 radially outward to signal line 30. The conductive element 140' is formed by removing material on opposite sides to form straight radial slots 141'. The cut out apertures 150 are formed to remove a sufficient amount of the mass opposite of the conductive element 140' so as to balance the rotational inertia mass 112' about the center of the rotational inertia mass 112' which is at the center of central member 15.

By connecting the rotational inertia mass 12 to the fixed central member 15 via the plurality of inner support arms 16A–16D, (FIG. 1) and further connecting the rotational inertia mass 12 to the fixed outer member via the outer support arms 40A–40D, the angular accelerometer 10 is less sensitive to stresses induced by fabrication processing, packaging, handling, and structural asymmetries. By providing cut out apertures 150 (see FIGS. 10 and 11) in the rotational inertia mass to compensate for an imbalance in the rotational inertia mass, the angular accelerometer 112 is provided in the balanced state and, thus, is less sensitive to linear cross-axis accelerations. Additionally, the realization of high gain enhances immunity to EMI signals and environmental conditions such as humidity and temperature. Further, the angular accelerometer provides high gain for angular accelerations about the sensing axis, while minimizing linear and cross-axis sensitivities. The resultant angular accelerometer achieves low sensitivity to external handling and environmentally induced stresses, and can be manufactured at low cost.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:
1. An angular accelerometer comprising:
   a substrate;
   a fixed electrode supported on the substrate and including a first plurality of fixed capacitive plates;
   a rotational inertia mass suspended over a cavity and including a central opening and a plurality of movable capacitive plates arranged to provide a capacitive coupling with said first plurality of fixed capacitive plates;
   a central member fixed to said substrate and located substantially in the central opening of said rotational inertia mass;
   a slot formed in said rotational inertia mass;
   a signal line extending within the slot formed in the rotational inertia mass;
   a plurality of support arms extending between the central member and the rotational inertia mass for supporting the rotational inertia mass relative to the fixed electrode and allowing rotational movement of the rotational inertia mass upon experiencing an angular acceleration about a sensing axis; and one or more apertures formed in the rotational inertia mass so as to balance the rotational inertia mass to compensate for the slot and provide a center of mass substantially centered about the rotational inertia mass.

2. The angular accelerometer as defined in claim 1 further comprising:

an input electrically coupled to one of the fixed electrodes and the rotational inertia mass for receiving an input signal; and an output electrically coupled to the other of the fixed electrode and the rotational inertia mass for providing an output signal which varies as a function of change of the capacitive coupling and is indicative of angular acceleration.

3. The angular accelerometer as defined in claim 1, wherein said slot extends radially outward from the central member.

4. The angular accelerometer as defined in claim 1, wherein said slot comprises a folded semi-circular portion.

5. The angular accelerometer as defined in claim 1, wherein each of said plurality of support arms comprises a radial extending support arm.

6. The angular accelerometer as defined in claim 1, wherein said rotational inertia mass is substantially centrally located, and said fixed electrode is radially displaced from said rotational inertia mass.

7. The angular accelerometer as defined in claim 1, wherein said one or more apertures are formed on one side of the rotational inertia mass opposite the slot.

8. The angular accelerometer as defined in claim 1, wherein said substrate comprises a silicon substrate.

9. The angular accelerometer as defined in claim 1, wherein said angular accelerometer is fabricated by a trench etching process, and said one or more apertures are formed by etching.

10. The angular accelerometer as defined in claim 1, wherein each of said plurality of support arms comprises at least four equiangularly located support arms.

11. The angular accelerometer as defined in claim 1, wherein each of said plurality of support arms are flexible so as to bend during angular acceleration about the sensing axis, and yet rigid to resist bending due to acceleration about non-sensing axes.

12. An angular accelerometer comprising:

a substrate;

a first bank of variable capacitors formed of first plurality of fixed capacitive plates and a first plurality of movable capacitive plates;

a second bank of variable capacitors formed of a second plurality of fixed capacitive plates and a second plurality of movable capacitive plates;

a rotational inertia mass configured as a ring having a central opening and rotatable in response to angular acceleration, wherein the rotational inertia mass is electrically coupled to said first and second plurality of movable capacitive plates and arranged so that said first and second plurality of movable capacitive plates form capacitive couplings with said first and second plurality of fixed capacitive plates;

a central member fixed to said substrate and located substantially in the central opening of said rotational inertia mass;

a slot formed in said rotational inertia mass;

a signal line extending within the slot formed in the rotational inertia mass;

a plurality of support arms extending between the central member and the rotational inertia mass for supporting the rotational inertia mass relative to the fixed electrode and allowing rotational movement of the rotational inertia mass upon experiencing an angular acceleration about a sensing axis; and one or more apertures formed in the rotational inertia mass so as to balance the rotational inertia mass to compensate for the slot and provide a center of mass substantially centered about the rotational inertia mass.

13. The angular accelerometer as defined in claim 12 further comprising:

an input electrically coupled to one of the fixed electrodes and the rotational inertia mass for receiving an input signal; and an output electrically coupled to the other of the fixed electrode and the rotational inertia mass for providing an output signal which varies as a function of change of the capacitive coupling and is indicative of angular acceleration.

14. The angular accelerometer as defined in claim 12, wherein said rotational inertia mass is configured substantially as a circular ring.

15. The angular accelerometer as defined in claim 12, wherein said plurality of support arms are substantially equiangularly located.

16. The angular accelerometer as defined in claim 12, wherein said substrate comprises a silicon substrate.

17. The angular accelerometer as defined in claim 12, wherein said angular accelerometer is fabricated by a trench-etching process and the one or more apertures are formed by etching.

18. The angular accelerometer as defined in claim 12, wherein said slot extends radially outward from the central member.

19. The angular accelerometer as defined in claim 12, wherein said slot comprises a folded semi-circular portion.

20. The angular accelerometer as defined in claim 12, wherein said one or more apertures are formed on one side of the rotational inertia mass opposite the slot.

21. A micromachined angular accelerometer comprising:

a substrate;

a fixed electrode supported on the substrate and including a first plurality of fixed capacitive plates;

a rotational ring having a central opening and including a plurality of movable capacitive plates at the outer perimeter and arranged to provide a capacitive coupling with the first plurality of fixed capacitive plates, said rotational ring being suspended over a cavity and rotationally movable relative to said fixed electrode;

a central member fixed to said substrate and located substantially in the center of central opening of said rotational ring;

a slot formed in said rotational ring;

a signal line extending within the slot formed in the rotational ring;

a plurality of support arms extending between the central member and the rotational ring for supporting the rotational ring relative to the fixed electrode and allowing rotational movement of the rotational ring upon experiencing an angular acceleration about a sensing axis;

one or more etched apertures formed in the rotational ring so as to balance the rotational ring to compensate for the slot and provide a center of mass substantially centered about the rotational ring;

an input electrically coupled to one of the fixed electrodes and the rotational ring for receiving an input signal; and an output electrically coupled to the other of the fixed electrode and the rotational ring for providing an output signal which varies as a function of change of the capacitive coupling and is indicative of angular acceleration.

22. The angular accelerometer as defined in claim 21, wherein said rotational ring is configured substantially as a circular ring.

23. The angular accelerometer as defined in claim 21, wherein said plurality of support arms are substantially equiangularly located.

24. The angular accelerometer as defined in claim 21, wherein said substrate comprises a silicon substrate.

25. The angular accelerometer as defined in claim 21, wherein said angular accelerometer is fabricated by a trench-etching processing.

26. The angular accelerometer as defined in claim 21, wherein said slot extends radially outward from the central member.

27. The angular accelerometer as defined in claim 21, wherein said slot comprises a folded semi-circular portion.

28. The angular accelerometer as defined in claim 21, wherein said one or more apertures are formed on one side of the rotational inertia mass opposite the slot.

* * * * *